(12) United States Patent
Åkerlund

(10) Patent No.: US 7,429,964 B2
(45) Date of Patent: Sep. 30, 2008

(54) DISPLAY DEVICE AND DISPLAY METHOD

(75) Inventor: Hans Åkerlund, Göteborg (SE)

(73) Assignee: Saab AB, Linkoping (SE)

( * ) Notice: Subject to any disclaimer, the term of this patent is extended or adjusted under 35 U.S.C. 154(b) by 289 days.

(21) Appl. No.: 10/479,849

(22) PCT Filed: Jun. 6, 2002

(86) PCT No.: PCT/SE02/01090

§ 371 (c)(1), (2), (4) Date: Dec. 8, 2003

(87) PCT Pub. No.: WO02/101444

PCT Pub. Date: Dec. 19, 2002

(65) Prior Publication Data

US 2004/0155876 A1 Aug. 12, 2004

(30) Foreign Application Priority Data

Jun. 11, 2001 (SE) .................................. 0102082

(51) Int. Cl.
*G09G 5/00* (2006.01)

(52) U.S. Cl. .................. 345/8; 345/7; 345/9; 351/211; 351/221

(58) Field of Classification Search .............. 345/7–9; 351/211, 221
See application file for complete search history.

(56) References Cited

U.S. PATENT DOCUMENTS

| | | | |
|---|---|---|---|
| 5,515,183 A * | 5/1996 | Hashimoto | 359/9 |
| 5,832,009 A | 11/1998 | Kikuchi | |
| 5,991,316 A | 11/1999 | Kikuchi | |
| 6,008,781 A | 12/1999 | Furness, III et al. | |
| 6,325,513 B1 * | 12/2001 | Bergner et al. | 351/221 |

(Continued)

FOREIGN PATENT DOCUMENTS

EP 0 473 343 3/1992

(Continued)

OTHER PUBLICATIONS

Pierre St. Hilaire et al., "Synthetic aperture holography: a novel approach to three-dimensional displays" dated Oct. 30, 1991; Journal of the Optical Society of America, vol. 9, No. 11, Wash. D.C., pp. 1969-1977.

(Continued)

*Primary Examiner*—Richard Hjerpe
*Assistant Examiner*—Leonid Shapiro
(74) *Attorney, Agent, or Firm*—Venable LLP; Michael A. Sartori; Jeffri A. Kaminski

(57) ABSTRACT

The invention concerns a device for displaying an image directly on the retina (6) of the eye (5). The device comprises means (1) arranged to emit laser radiation and modulating means (2) arranged in the beam path between the laser-radiation-emitting means (1) and the eye (5) so as to modulate the laser radiation. The device is characterized in that the modulating means (2) are arranged so as to modulate the phase front of the laser beam so that, when it strikes the refracting elements of the eye, it is deflected in a direction distinct from the direction obtained with unmodulated radiation. The invention also includes a method of displaying a retinal image.

14 Claims, 3 Drawing Sheets

U.S. PATENT DOCUMENTS

| | | | |
|---|---|---|---|
| 6,466,372 B1 * | 10/2002 | Morris et al. | 359/567 |
| 6,523,955 B1 * | 2/2003 | Eberl et al. | 351/211 |
| 6,600,460 B1 * | 7/2003 | Mays, Jr. | 345/7 |
| 6,813,085 B2 * | 11/2004 | Richards | 359/630 |

FOREIGN PATENT DOCUMENTS

| | | |
|---|---|---|
| JP | 05-072958 | 3/1993 |
| JP | 2005-505787 | 2/2005 |
| WO | WO 02/101444 A1 | 12/2002 |

OTHER PUBLICATIONS

Mark Lucente et al., Nw Approaches to Holographic Video, XP-002298455, SPIE vol. 1732, Holographicw International '92, pp. 377-386.

Japanese Office Action, Japanese Application No. 2003-504146, Ref. No. SA15473, Transmission Date May 8, 2007, Applicant: SAAB AB.

* cited by examiner

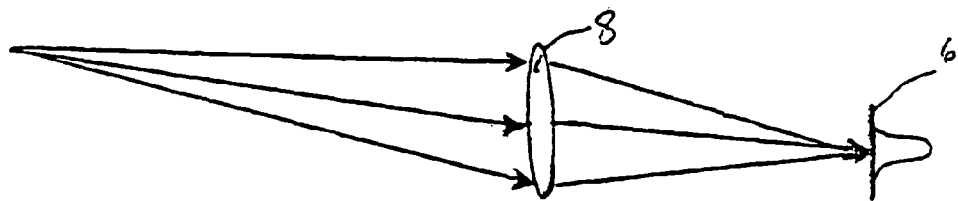
Fig 2a
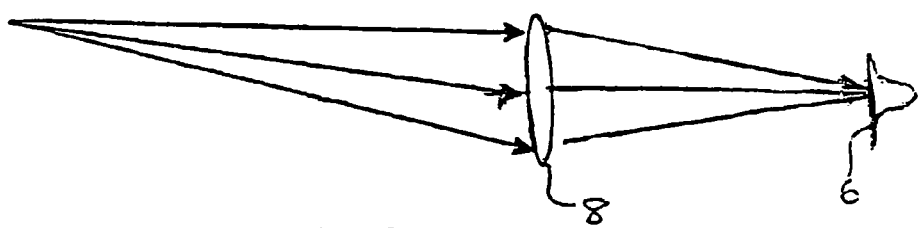
Fig 2b
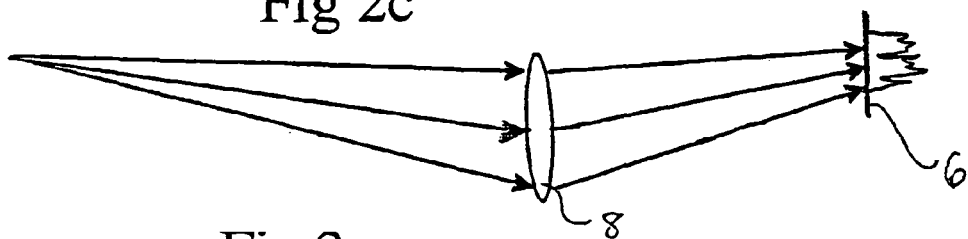
Fig 2c
Fig 3a
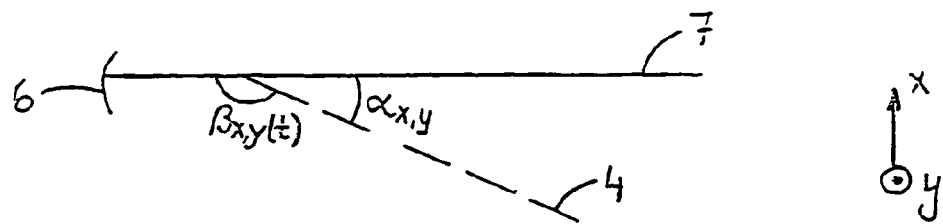
Fig 3b
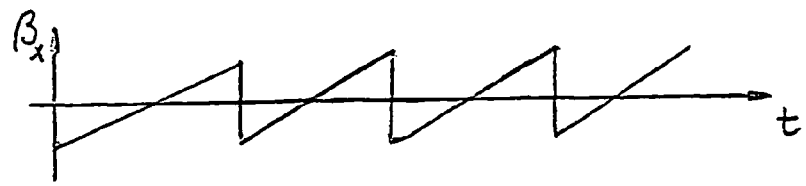
Fig 3c
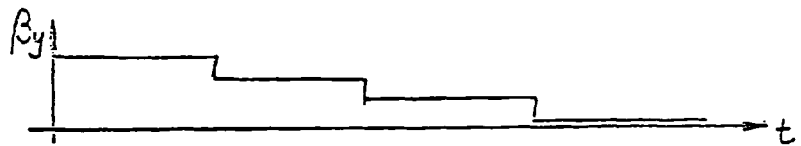

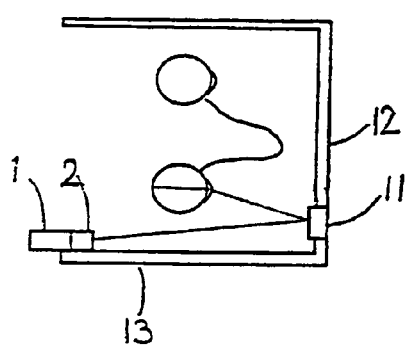
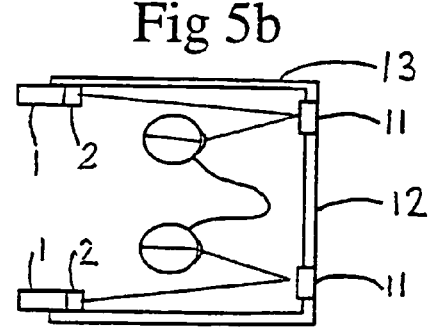
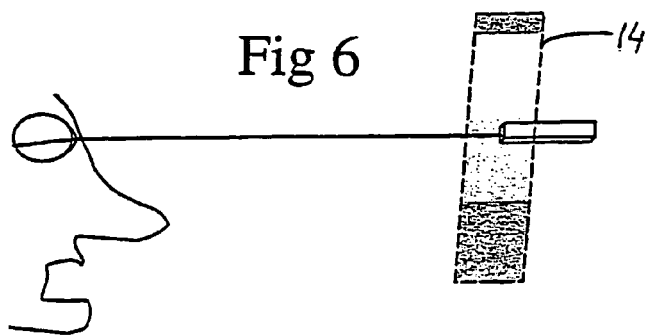
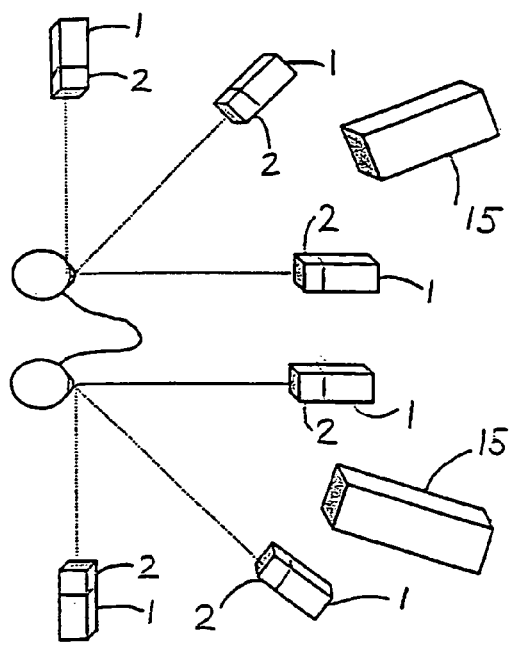
Fig 5a
Fig 5b
Fig 6
Fig 7

DISPLAY DEVICE AND DISPLAY METHOD

TECHNICAL AREA

This invention concerns a device for producing an image directly on the retina of the eye as per the preamble to claim 1.

The invention also concerns a corresponding method for producing a retinal image.

STATE OF THE ART

When information is to be displayed, an image plane on which the information is projected is often used. The image plane can consist of, e.g. a TV screen, monitor or the like. However, methods also exist to build up an image on the retina of the eye that do not require that the image information be supplied via an image plane.

U.S. Pat. No. 6,008,781 describes a system that projects a virtual image directly onto the retina without the use of an image surface. The system comprises a photogenerator arranged so as to emit radiation. The photogenerator consists of, e.g. a laser or includes LED diodes, which emit red, green and blue light. The system further comprises means for manipulating the emitted radiation to create video-modulated signals. The video-modulated signals can be scanned both horizontally and vertically to create a modulated light raster, which is projected directly onto the eye of the user via projection optics. It is necessary for the projection optics to be arranged in such a way that the eye points directly toward the incident video-modulated signals, which means in practice that the projection optics, in the form of, e.g. mirrors, must be positioned so that the eye is looking directly at them. The aforedescribed system is also extremely sensitive to interference and requires that the manipulated beam be pointed precisely at the eye, and that the beam lobe of the radiation be narrow enough that the entire beam can pass through the pupil of the eye to strike the retina.

DESCRIPTION OF THE INVENTION

One object of the invention is to eliminate the need for positioning equipment such as the aforedescribed projection optics centrally in front of the eye. Another object of the invention is to solve the problem of sensitivity to interference.

According to one embodiment, this is achieved by means of a device comprising means arranged to emit laser radiation, plus modulating means arranged to modulate the laser beam that are arranged in the beam path between the laser-radiation-emitting means and the eye. The device is characterized in that the modulating means are arranged so as to modulate the phase front of the laser beam in such a way that, upon striking the refracting elements of the eye, the beam is deflected in a direction that is distinct from a direction obtained with unmodulated radiation.

Using this device, a retinal image can be created in at least two different ways. According to the first such way, the modulating means of the device are arranged so as to modulate the phase front of the laser beam in such a way that, upon deflection, the beam is focused on a defined point on the retina of the eye, while the modulating means are further arranged so as to continuously remodulate the laser beam so as to move this point in order to build up the retinal image.

According to the second such way, the modulating means of the device are arranged so as to modulate the phase front so that the beam contains, at each moment in time, information for producing the entire retinal image.

To eliminate the necessity of positioning the equipment centrally in front of the eye, the modulating means are arranged relative to the eye in one advantageous embodiment in such a way that the modulated laser beam strikes the eye at an angle distinct from the optical axis of the eye, while the modulated means are arranged so as to modulate the wavefront so that it is deflected in such a way that the beam is projected onto the retina centrally around the optical axis.

To render the device less sensitive to the positioning of the eye relative to the incident laser beam, the beam lobe has, at the eye, a cross-section that is larger than 3 cm$^2$, e.g. 5 cm$^2$.

In a preferred embodiment, the modulating means comprise a so-called SLM (spatial light modulator) and controlling means arranged to control the adjustment of the spatial light modulator. To summarize briefly, the spatial light modulator can display patterns that consist of quantized phase patterns (pixelated) and function as a phase/amplitude converter for laser radiation. A spatial light modulator is thus a phase/amplitude modulator, wherein the intensity and phase of the incident laser radiation can be controlled for each pixel of the light modulator. By using the spatial light modulator for combined phase and possible amplitude modulation of the cross-section of the incident laser beam, the laser beam is made capable of refraction into an image of an object or to a given point upon passing through one or a plurality of refracting elements.

The invention also includes a method according to claim 9.

BRIEF DESCRIPTION OF FIGURES

FIG. 2a shows unmodulated laser radiation that is striking the retina of the eye, FIG. 2b shows modulated laser radiation that is striking a point on the retina of the eye, FIG. 2c shows modulated laser radiation that is striking a surface on the retina of an eye, FIGS. 3a, b and c show an example of control of the modulated beam in FIG. 2b in the eye, FIG. 5 shows an exemplary installation of the image-display system in eyeglass frames, FIG. 6 shows an exemplary use of the image-display system in a display screen application, FIG. 7 shows an example of the image-display system in a wide-angle application.

EMBODIMENTS

Figure 1:
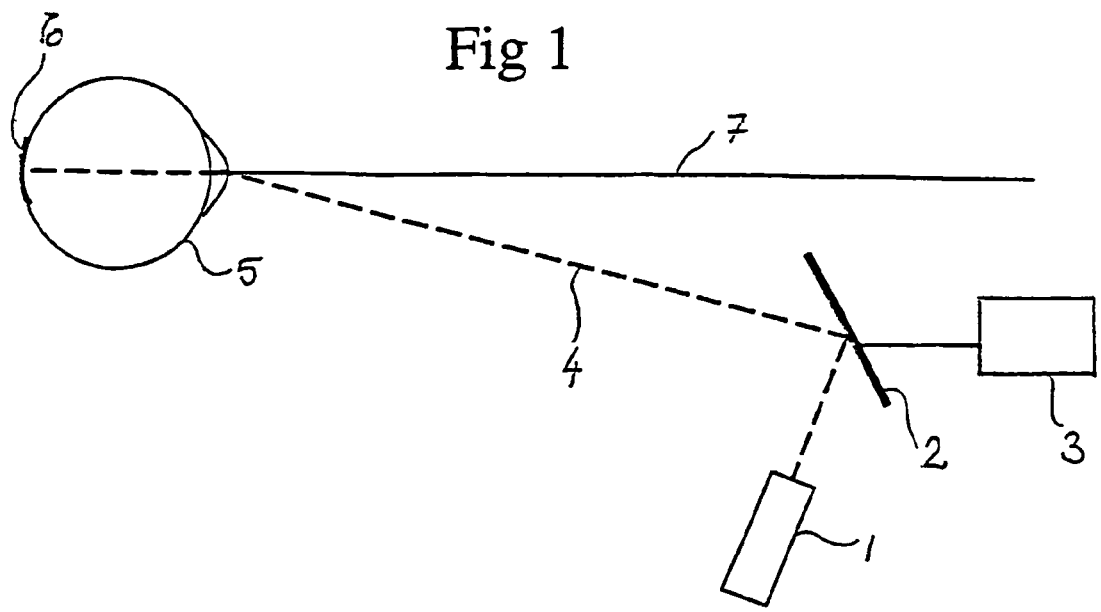
FIG. 1 shows an example of an image-display system according to the invention.

Reference number 1 in FIG. 1 designates a laser that is emitting a laser beam 4 at a spatial light modulator 2 (SLM) at a fixed angle. In the example shown, the light modulator is of the reflecting type, but it could also conceivably consist of a light modulator of the transmitting type, in which case the laser 1 would be disposed behind the light modulator. There is connected to the light modulator 2 a calculating unit 3 in the form of, e.g. a personal computer, which is arranged so as to affect the adjustment of the phase pattern of the light modulator 2. The laser 1 and the light modulator 2 are positioned relative to one another in such a way that the radiation modulated by the light modulator 2 strikes an approximate position where an eye 5 is expected to be present. The incident beam is refracted by the refracting elements 8 of the eye so as to be focused on the retina of the eye. The refracting elements of the eye essentially consist of the cornea and lens of the eye, but they also include the intraocular fluid and the vitreous body.

In FIG. 2a, unmodulated radiation as per the state of the art strikes the refracting elements 8 of the eye so as to be focused at a point on the retina of the eye as determined by the geometry of said refracting elements. The intensity pattern of the unmodulated beam exhibits a Gaussian distribution at said point.

In FIG. 2b, modulated radiation strikes the refracting elements 8 of the eye and is refracted in a direction determined by the phase front of the laser beam toward a point on the retina of the eye determined by said direction. In this embodiment, the intensity pattern of the modulated beam exhibits a Gaussian distribution at said point.

In FIG. 2c the modulated beam strikes the refracting elements 8 so as, in similarity with the embodiment described in connection with FIG. 2b, to be refracted to a position determined via the phase modulation. Furthermore, the refracting elements reform the laser beam so that it assumes an intensity pattern that is also determined by the phase modulation. It should be noted that, when the beam is phase-modulated, a phase hologram is produced in the cross-section of the beam. As a result, the laser beam need not be centered on the eye to produce an image on the retina. It suffices for the eye to be somewhere in the laser lobe for the image to be produced on the retina. How great a portion of the laser lobe must pass through the pupil of the eye depends on the resolution quality that can be obtained from the light modulator. Low resolution in the phase hologram demands that a greater portion of the energy of the laser beam strike the retina, whereupon a larger portion of the phase information of the beam will be utilized. Conversely, a smaller portion of the phase information is used in connection with a high-resolution hologram, i.e. an acceptable image can be produced on the retina using a smaller portion of the laser lobe.

In the embodiment shown in FIG. 1, the laser beam is modulated in such a way that it is refracted by the refracting elements so that the beam is focused on the retina 6 of the eye along an axis that is coincident with the optical axis 7 of the eye. Thus, neither the light modulator nor the projection optics that control the modulated laser beam from the light modulator needs to be arranged along the optical axis of the eye.

In FIG. 3a the laser beam 4 strikes the eye at an angle $\alpha$ relative to the optical axis of the eye. The calculating unit 3 is arranged to furnish data for adjusting the light modulator 2 so that the laser beam refracts, by means of the refracting elements 8 of the eye, the modulated laser beam so as to focus it on a defined point on the retina of the eye, and so that the laser beam is continuously remodulated to move this point in order to build up the retinal image. FIG. 3b shows how an angle $\beta$ between the incident beam and the refracted beam varies over time in the x-direction, while the angle of incidence $\alpha$ remains essentially constant over time. FIG. 3c shows how the angle $\beta$ varies over time in the y-direction. As noted above, it is not critical for the eye to be placed exactly along the line of symmetry of the modulated laser beam; the eye needs only to be positioned somewhere within the laser lobe in order to be able to focus an accurate image on the retina. For example, the width of the beam lobe is greater than 3 cm, and greater than 5 cm in an alternative embodiment in which the eye is not expected to remain entirely motionless relative to the incident laser beam. To achieve a desired beam lob, the modulator can modulate the beam so that it has the desired width at the eye or, alternatively, a lens (not shown) that disperses the beam in the desired way can be arranged in the beam path after the modulator 2.

The adjustment of the light modulator 2 can alternatively be such that the deflected beam forms the entire retinal image at each moment in time. As noted above, it is not decisive for the entire laser beam to pass through the pupil of the eye in this embodiment either.

The production of hardware and/or software for the calculating unit 3 used to calculate the surface pattern of the light modulator to produce a desired modulation of the laser beam is not within the scope of this invention. The creation of software/hardware to calculate the phase pattern of the light modulator needed to achieve a desired modulation of the laser beam will be a routine procedure to one skilled in the art. The design of the functions and algorithms in the software/hardware is determined by a number of parameters, such as the material used for the phase pattern in the light modulator, the type of laser, the laser wavelength used, etc.

Figure 4:
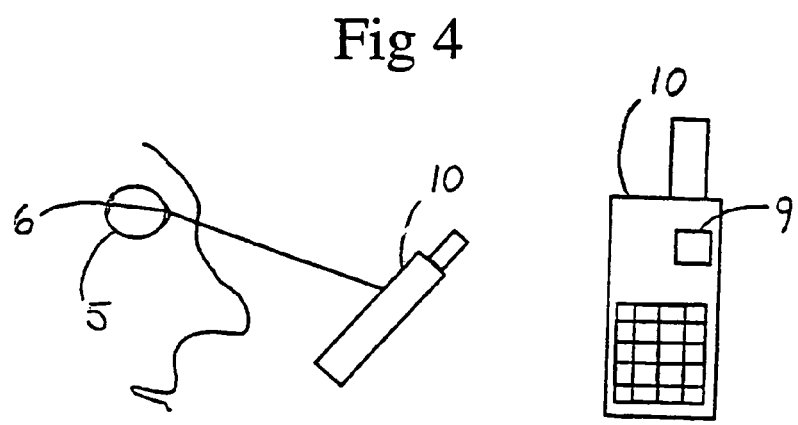
FIG. 4 shows an exemplary use of modulated radiation to create a virtual display in a mobile telephone application.

In FIG. 4 the laser source 1 and the light modulator 2 are built into a mobile telephone 10, whereupon modulated laser radiation is emitted from the mobile telephone 10 via an opening 9, which is square in the figure and characteristically has a cross-section of 1.5×1.5 cm. The modulated laser beam will then draw an image at full computer display resolution on the retina 6 of the eye 5 when the mobile telephone is held at a given distance in front of the eye.

In FIG. 5a the laser 1 and the spatial light modulator 2 are secured in the earpiece 13 of eyeglass frames 12. The modulated laser beam is reflected toward the eye by a mirror 11 arranged on the eyeglass frames 12 roughly in front of the eye. FIG. 5b shows a biocular design in which each earpiece 13 contains a laser 1 and a light modulator 2, and wherein a mirror 11 is arranged in front of each eye to reflect toward its associated eye.

In FIG. 6 the laser 1 and light modulator 2 are used to create a virtual display screen. A preferably dark plate 14 is, in the example shown, placed in front of the user to increase the image contrast. In this embodiment, an eyetracker (not shown) can be connected to the calculating unit. The calculating unit will then be arranged so as to calculate the modulation angle from the light modulator based on the position of the eye in order to position the image on the plate at eye height. Conceivable applications include PC screens and displays built into aircraft pilot seats. A three-dimensional display is achieved if a laser with its associated light modulator is provided for each eye.

In FIG. 7, six lasers with their associated light modulators are arranged in a semicircle around the head of an person. Two eyetrackers 15 are also arranged in front of the user. These eyetrackers 15 and lasers with their light modulators are used to create a wide-angle image, wherein the image is also seen in the peripheral vision. The lasers, light modulators and eyetrackers are fixedly mounted in, e.g. an aircraft cockpit.

The invention claimed is:

1. A device for displaying an image directly on the retina of the eye and comprising:
   means arranged so as to emit laser radiation; and
   modulating means arranged to receive a laser beam from the laser-radiation-emitting means and transmit a modulated laser beam directly to the eye by modulating the laser radiation, wherein in that the modulating means is arranged so as to modulate the phase front of the laser beam in such a way that, when the modulated laser beam strikes the refracting elements of the eye, it is deflected in a direction distinct from the direction obtained with unmodulated radiation and when the modulated laser beam strikes the eye at an angle distinct from an optical axis of the eye and is deflected by said refracting elements, the modulated laser beam is projected on a retina of the eye.

2. The device according to claim 1, wherein the modulating means are arranged so as to modulate the phase front of the laser beam in such a way that, upon deflection, the beam is focused on a defined point on the retina of the eye, and in that the modulating means are arranged so as to continuously remodulate the laser beam in order to move said point to build up the retinal image.

3. The device according to claim 1, wherein the modulating means are arranged so as to modulate the phase front in such a way that the beam contains, at each moment in time, information for producing the entire retinal image.

4. The device according to claim 1, wherein in that the modulating means are arranged relative to the eye in such a way that the modulated laser beam strikes the eye at an angle distinct from the optical axis of the eye, and in that the modulating means are arranged so as to modulate the wavefront so that it is deflected in such a way that the beam is projected onto the retina centered around the optical axis.

5. The device according to claim 1, wherein in that the modulating means comprise an arrangement involving at least one spatial light modulator.

6. The device according to claim 1, wherein it has means to disperse the modulated beam lobe so that its cross-section at the eye is larger than 3 $cm^2$.

7. The device according to claim 5, wherein it has means to disperse the modulated beam lobe so that its cross-section at the eye is larger than 5 $cm^2$.

8. The device according to claim 5, wherein the dispersing means consist of said spatial light modulator arrangement.

9. A method for displaying an image directly on the retina of an eye, the method comprising:
receiving laser radiation,
modulating the laser radiation and aiming the modulated laser radiation directly at a person's eye,
wherein a phase front of the modulated laser radiation is modulated so that, when it strikes the refracting elements of the eye, the modulated laser radiation is deflected in a direction distinct from that obtained with unmodulated radiation and where the phase front of said modulated laser radiation is modulated so that, when the modulated laser radiation strikes the eye at an angle distinct the optical axis of the eye and is deflected by said refracting elements, the modulated laser radiation is projected on a retina of eye.

10. The method according to claim 9, wherein in that the phase front is modulated in such a way that, upon deflection, the beam is focused on a defined point on the retina of the eye, and in that the phase front is continuously remodulated so that the defined point moves, thereby building up the retinal image.

11. The method according to claim 9, wherein in that the phase front is modulated in such a way that the beam contains, at each moment in time, information for producing the entire retinal image.

12. The method according to claim 9, wherein the modulated laser beam strikes the eye at an angle distinct from the optical axis of the eye, and in that the phase front is modulated in such a way that, upon deflection, the beam is projected onto the retina centrally around the optical axis.

13. The method according to claim 9, wherein, upon modulation, the beam lobe of the beam is dispersed so that its cross-section at the eye is larger than 3 $cm^2$.

14. A method according to claim 13, wherein it has means to disperse the modulated beam lobe so that its cross-section at the eye is larger than 5 $cm^2$.

* * * * *